3,005,723
PROCESS FOR PRODUCING COLORED PELLICU-
LAR GEL STRUCTURES OF REGENERATED
CELLULOSE
Irving Paul Batt, Buffalo, N.Y., assignor to E. I. du Pont
de Nemours and Company, Wilmington, Del., a corporation of Delaware
No Drawing. Filed Sept. 26, 1958, Ser. No. 763,437
6 Claims. (Cl. 106—164)

This invention relates to shrinkable, non-fibrous pellicles or bands of regenerated cellulose, and more particularly to an improved process for producing colored transparent, shrinkable, non-fibrous bands of regenerated cellulose employing vat dyestuffs as coloring agents.

Shrinkable, non-fibrous secondary closures, i.e., bands and caps of regenerated cellulose made by the viscose process, have been known and used extensively for a number of years. They provide an attractive decoration for bottles, jars, etc., a deterrent against tampering with the contents and, when colored, an effective background for printing advertising matter.

The vat dyes, because of their superior fastness properties, are a very desirable part of the pigmentation process of manufacturing colored regenerated cellulose bands and caps and have been used in their pigment (insoluble) form for some time in the manufacture of opaque bands and caps. In their insoluble form they are semi-opaque and are unsuitable for use in the manufacture of colored transparent bands and caps. This same property limits their use in the deeper shades of gold and metallic colors such as are described in Creadick, U.S. Patent 2,307,760, and O'Connell, U.S. Patent 2,716,614, because of the blinding action on the luster of mica plates by opacification. It has heretofore been proposed to reduce the dye to its soluble leuco state with an aqueous alkaline solution of sodium hydrosulphite, adding the leuco dye solution to the viscose, and thereafter oxidizing the dye to its original insoluble state in the acid bath used to regenerate the viscose to cellulose. However, although a more transparent pellicle was obtained, large quantities of dark colored dyestuff particles or visible specks were found to be dispersed through the entire pellicle.

To produce a transparent, colored regenerated cellulose band or cap it has therefore been necessary in the past to dye the regenerated cellulose pellicles with direct water-soluble dyes, an unsatisfactory procedure, since the water-soluble dyes are not color-fast in that such dyes have a tendency to bleed out of the bands or caps as they are maintained in the wet state before being applied to containers.

An object of this invention is to provide transparent colored, color-fast (i.e., non-bleeding), shrinkable pellicular structures, e.g., bands, of regenerated cellulose wherein the coloring agents are vat dyestuffs. Another object is to provide an improved process for coloring transparent, shrinkable pellicular structures of regenerated cellulose with vat dyes whereby to avoid the defects noted hereinabove. These and other objects will more clearly appear from the following description.

I have unexpectedly discovered that speck-free, transparent colored pellicles of regenerated cellulose which are color-fast (do not bleed) can be obtained with vat dyes by first mixing the vat dye in the viscose, then adding sodium hydrosulphite in an alkaline aqueous solution to the viscose to reduce the vat dye to its soluble leuco form. Oxidation back to its insoluble form takes place when the viscose is converted to regenerated cellulose in the acid regeneration tanks customarily employed in the viscose process, and the pellicle becomes transparent in the desulphuring bath of the conventional viscose process.

Accordingly, the objects enumerated above are achieved by the process of the present invention which, in brief, comprises mixing a vat dye with viscose in predetermined proportions depending on the depth of color desired in the regenerated cellulose pellicle, adding sodium hydrosulphite in aqueous alkaline solution to the mixture of vat dye and viscose in an amount sufficient to reduce the vat dye to its soluble leuco form, but insufficient to cause gelation of the viscose, deaerating the resulting viscose composition, and thereafter extruding said viscose composition in pellicular form into conventional aqueous acid coagulating and regenerating baths whereby to produce a pellicular structure of regenerated cellulose and to oxidize the leuco vat dye contained therein to its original insoluble state. The colored regenerated cellulose gel pellicle so produced is subsequently rendered transparent in the conventional desulphuring bath, and is then washed in the usual way to form a structure which shrinks in drying.

The term "vat dye" is used herein in its usual sense to denote a dye compound capable of reduction to a soluble leuco form which has affinity for cellulosic fiber, and which is readily reoxidized on the fiber to the original dye. While no general formula can be written covering vat dyes, they are almost always colored organic compounds containing two or more keto groups

which are capable of being reduced by sodium hydrosulphite to give leuco compounds which have an affinity for cellulosic fiber ("The Chemistry of Synthetic Dyes and Pigments" by H. A. Lubs, 1955).

In the preferred embodiment of this invention, the viscose to be colored is placed in a tank which can be agitated and evacuated. The desired amount of vat dyestuff is dispersed in water and the aqueous slurry is then dispersed through the viscose by agitation.

After the vat dyestuff has been thoroughly mixed with the viscose, an aqueous solution of sodium hydrosulphite containing sodium hydroxide is added to the viscose, thereby converting the vat dyestuff into its soluble leuco form. The minimum quantity of sodium hydrosulphite will necessarily vary depending on the requirements of the vat dye employed; the maximum concentration has been found to be approximately 7% by weight of sodium hydrosulphite, based on the weight of the solution, at a maximum temperature of 28° C. If the concentration of sodium hydrosulphite is too high, i.e., much over 7%, the viscose will gel. Generally, the preferred range is between 2% and 5% sodium hydrosulphite. The solution of sodium hydrosulphite should be added at such a rate as to prevent localized concentration of sodium hydrosulphite sufficient to cause gelation of the viscose.

The following examples will serve to further illustrate the principles and practice of this invention. Parts and percentages are by weight unless otherwise indicated.

*Example 1*

Three parts of the yellow vat dye disclosed in Example 10 of the U.S. Patent 2,599,699 in water slurry form was dispersed through 1000 parts of viscose contained in a tank equipped with a stirrer. After mixing and evacuating the viscose and vat dye slurry for approximately 2 hours, the following solution was added to the viscose at a rate not exceeding 4 parts of solution per minute:

|  | Parts |
|---|---|
| Sodium hydrosulphite concentrate | 2 |
| Cold soft water | 35 |
| 26% sodium hydroxide solution | 6 |

Mixing under evacuation of the viscose, vat dyestuff and sodium hydrosulphite solution was continued for 8 hours to thoroughly deaerate the mixture. Then the viscose was cast in tubing form in the usual manner, maintaining the sodium sulphide content of the desulphuring bath at 0.80% and at a temperature of 92° C. A beautiful transparent, color-fast, yellow gel tubing free of dye specks and suitable for shrinkable bands resulted.

Example 2

3.8 parts of the yellow vat dye disclosed in Example 1 of U.S. Patent 1,090,621 and 0.2 part of a brown vat dye (Color Index Number 1120[1]) were slurried in a small amount of water and dispersed through 1000 parts of viscose. After mixing and evacuating for approximately 2 hours, the following solution was added to the viscose at a rate not exceeding 4 parts of solution per minute:

|  | Parts |
|---|---|
| Sodium hydrosulphite concentrate | 2 |
| Cold soft water | 40 |
| 26% sodium hydroxide solution | 7.5 |

[1] Rowe's Color Index, 1924.

Mixing and evacuation were continued for another 11 hours. The viscose was then cast in tubing form in the usual manner, maintaining the sodium sulphide content of the desulphuring bath at 0.85% and the temperature of the bath at 94° C. A transparent, color-fast, golden yellow tubing suitable for shrinkable bands resulted.

Example 3

1.53 parts of a green vat dye (A.A.T.C.C., vol. 2, Color Index Number 59825) and 0.57 part of an orange vat dye (A.A.T.C.C., vol. 2, Color Index Number 59700) were slurried in 4 parts of cold soft water, run through a 325 mesh screen and dispersed in 1000 parts of viscose. After mixing and evacuating for 3 hours, the following solution was added at a rate not exceeding 4 parts of solution per minute:

|  | Parts |
|---|---|
| Sodium hydrosulphite concentrate | 2 |
| Cold soft water | 40 |
| 26% sodium hydroxide solution | 12 |

Mixing and evacuation continued for 12 hours. The viscose was cast in tubing form in the usual manner, maintaining the concentration of sodium sulphide in the desulphuring bath at 85% and the temperature of the bath at 90° C. A beautiful emerald green tubing for bands resulted.

Example 4

3.75 parts of the yellow vat dye disclosed in Example 2 of U.S. Patent 1,998,205 were slurried in water and added to 1000 parts of viscose. After mixing and evacuating for 2.5 hours, the following solution was added at a rate not in excess of 4 parts of solution per minute:

|  | Parts |
|---|---|
| Sodium hydrosulphite concentrate | 2.25 |
| Cold soft water | 40 |
| 26% Sodium hydroxide solution | 7.5 |

Mixing and evacuation were continued for 13 hours. The viscose was cast in tubing form in the usual manner, maintaining the sodium sulphide content of the desulphuring bath at 0.90% and the temperature at 92° C. A transparent, color-fast, golden tubing for bands resulted.

Example 5

Three parts of an orange vat dye (A.A.T.C.C., vol. 2, Color Index #59700) and 0.15 part of a violet vat dye (A.A.T.C.C., vol. 2, Color Index #60010) were slurried in 8 parts of cold soft water, run through a 325 mesh screen and dispersed in 1000 parts of viscose. 136 parts of heat treated, wet ground mica (see O'Connell, U.S. Patent 2,716,614) 25% slurry were also dispersed in the viscose. After mixing and evacuating for 2 hours, the following solution was added at a rate not exceeding 4 parts per minute:

|  | Parts |
|---|---|
| Sodium hydrosulphite concentrate | 2 |
| Cold soft water | 45 |
| 26% Sodium hydroxide solution | 12 |

Mixing and evacuation continued 10 hours. The viscose was then cast in tubing form in the usual manner, maintaining the concentration of sodium sulphide in the desulphuring bath at 0.75% and the temperature at 88° C. A bright golden metallic tubing for bands resulted.

Example 6

Three parts of a yellow vat dye (Color Index Number 1132) and 1 part of an orange vat dye (Color Index Number 1096) were slurried in water and dispersed in 1000 parts of viscose. After mixing and evacuating for 3 hours, the following solution was added at a rate not in excess of 4 parts of solution per minute:

|  | Parts |
|---|---|
| Sodium hydrosulphite concentrate | 2.0 |
| Cold soft water | 40 |
| 26% Sodium hydroxide solution | 7.5 |

Mixing and evacuation were continued for 14 hours. The viscose was cast in tubing form in the usual manner, maintaining the sodium sulphide content of the desulphuring bath at 0.8% and the temperature at 91° C. A transparent, color-fast, golden yellow tubing for bands resulted.

Example 7

0.23 part of a red vat dye (A.A.T.C.C., vol. 2, Color Index Number 67000) was slurried in 8 parts of cold soft water not over 28° C. run through a 325 mesh screen and dispersed in 1000 parts of viscose. After mixing and evacuating for 3 hours, the following solution was added at a rate not to exceed 4 parts of solution per minute:

|  | Parts |
|---|---|
| Sodium hydrosulphite concentrate | 2 |
| Cold soft water | 40 |
| 26% Sodium hydroxide solution | 12 |

Mixing and evacuation continued for 12 hours. The viscose was then cast in tubing form in the usual manner, maintaining the concentration of the desulphuring bath at 0.6% and the temperature of the bath at 90° C. A light pink transparent tubing for bands resulted.

Example 8

1.75 parts of the vat dye disclosed in U.S. Patent 1,667,848 and 1.75 parts of the vat dye disclosed in Example 1 of U.S. Patent 1,090,621 were slurried in water and dispersed in 1000 parts of viscose. 136 parts of heat-treated, wet-ground mica (see O'Connell, U.S. Patent 2,716,614) slurried in a small amount of water were also dispersed in the viscose. After mixing and evacuating for 3 hours, the following solution was adedd at a rate not exceeding 4 parts of solution per minute:

|  | Parts |
|---|---|
| Sodium hydrosulphite concentrate | 2 |
| Cold soft water | 40 |
| 26% sodium hydroxide solution | 8 |

Mixing and evacuation were continued for 15 hours. The viscose was cast in tubing form in the usual manner maintaining the concentration of sodium sulphide in the desulphuring bath at 0.75% and the temperature of the bath at 90° C. A beautiful golden, color-fast, metallic-looking tubing for bands resulted.

Example 9

0.21 part of a blue vat dye (A.A.T.C.C., vol. 2, Color Index Number 69810) was slurried with 4 parts of cold soft water under 28° C., run through a 325 mesh screen and dispersed in 1000 parts of viscose. After mixing and evacuating for 3 hours, the following solution was added at a rate not to exceed 4 parts of solution per minute:

| | Parts |
|---|---|
| Sodium hydrosulphite concentrate | 2 |
| Soft water at 28° C | 40 |
| 26% sodium hydroxide solution | 12 |

Mixing and evacuation continued for 12 hours. The viscose was cast in tubing form in the usual manner, maintaining the concentration of sodium sulphide in the desulphuring bath at 0.8% and the temperature at 89° C. A beautiful light blue transparent tubing for bands was produced.

I claim:
1. A process for producing colored pellicular structures of regenerated cellulose which comprises uniformly dispersing a vat dye in viscose, adding to the resulting dispersion an aqueous solution of sodium hydrosulphite containing an amount of sodium hydrosulphite sufficient to reduce said vat dye to its soluble leuco state but insufficient to effect gelation of said viscose; and thereafter extruding the mixture of viscose and reduced vat dye in pellicular form into an aqueous acid bath whereby to convert said reduced vat dye to its original state and to produce a colored gel regenerated cellulose pellicular structure.

2. The process of claim 1 wherein the amount of sodium hydrosulphite added to the dispersion of vat dye and viscose constitutes not more than 7% by weight, based on the weight of the solution.

3. The process of claim 1 wherein the amount of sodium hydrosulphite added to the disperson of vat dye and viscose constitutes from 2% to 5% by weight, based on the weight of the solution.

4. A process for producing transparent, colored pellicular structures of regenerated cellulose which comprises uniformly dispersing a vat dye in viscose, adding to the resulting dispersion an aqueous solution of sodium hydrosulphite containing an amount of sodium hydrosulphite sufficient to reduce said vat dye to its soluble leuco state but insufficient to effect gelation of said viscose; extruding the mixture of viscose and reduced vat dye in pellicular form into an aqueous acid bath whereby to convert said reduced vat dye to its original state and to produce a colored gel regenerated cellulose pellicular structure, and thereafter passing said gel structure into a desulphuring bath.

5. The process of claim 4 wherein the amount of sodium hydrosulphite added to the dispersion of vat dye and viscose constitutes not more than 7% by weight, based on the weight of the solution.

6. The process of claim 4 wherein the amount of sodium hydrosulphite added to the dispersion of vat dye and viscose constitutes from 2% to 5% by weight, based on the weight of the solution.

References Cited in the file of this patent

UNITED STATES PATENTS

| | | |
|---|---|---|
| 1,865,701 | Lockhart | July 5, 1932 |
| 2,043,069 | Rusch et al. | June 2, 1936 |
| 2,064,356 | Picard et al. | Dec. 15, 1936 |
| 2,143,883 | Kline et al. | Jan. 17, 1939 |
| 2,716,614 | O'Connell | Aug. 30, 1955 |
| 2,738,252 | Lutgerhorst | Mar. 13, 1956 |